Dec. 18, 1945.   D. W. MAIN   2,391,022

SELF-SEALING COUPLING

Filed April 26, 1943

Inventor
DONALD W. MAIN
By Beaman & Langford
Attorneys

Patented Dec. 18, 1945

2,391,022

UNITED STATES PATENT OFFICE 2,391,022

SELF-SEALING COUPLING

Donald W. Main, Jackson, Mich., assignor to Michigan Patents Corporation, Jackson, Mich., a corporation of Michigan Application April 26, 1943, Serial No. 484,579

3 Claims. (Cl. 284—19)

The present invention relates to improvements in couplings of the type shown in United States Patent No. 2,208,286 granted July 16, 1940, Patent No. 2,254,997 granted September 2, 1941, and Patent No. 2,311,239 granted February 16, 1943.

Each of the foregoing types of couplings requires a multiple sealing arrangement. The present invention simplifies the prior art constructions by providing a single sealing structure to provide the functions of the prior art multiple sealing structures.

Accordingly, an object of the present invention is to provide a self-sealing coupling having a single sealing structure.

Another object of the invention is to provide a self-sealing coupling wherein a sealing member engages with one surface to be sealed when the coupling is closed and with another sealing surface when the coupling is open.

Figure 1:
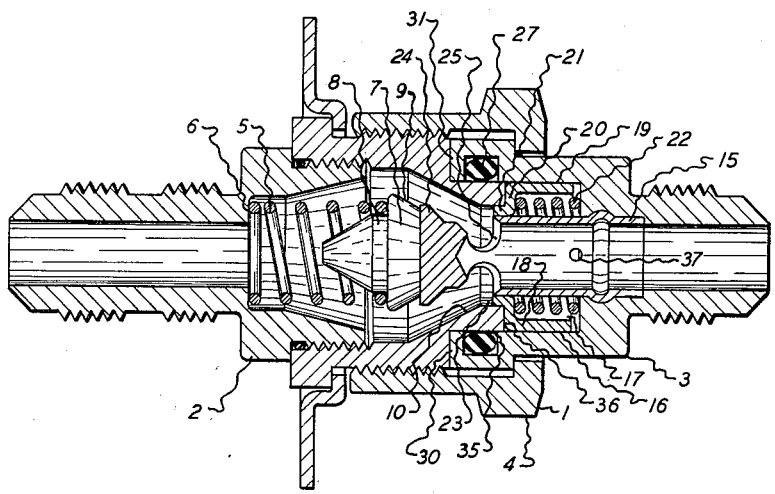
Figure 2:
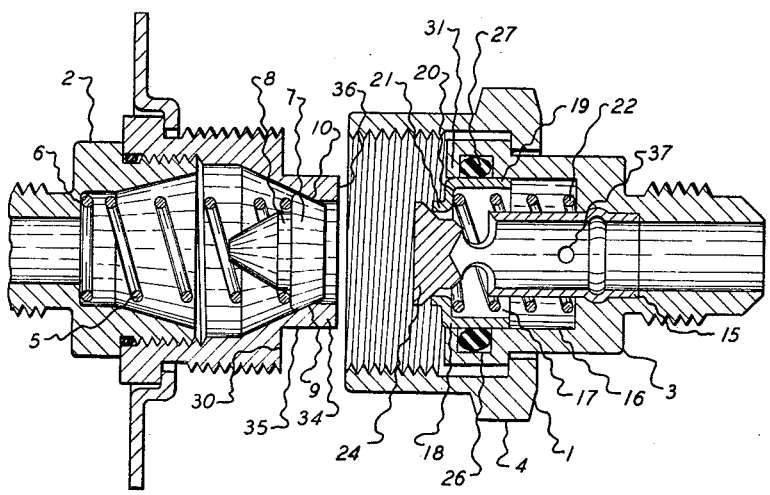

These and other objects residing in the construction, arrangement and combination of the parts will be apparent from the following specification when taken with the accompanying drawing, in which Fig. 1 is a vertical cross-sectional view of the coupling closed, and Fig. 2 is a view similar to Fig. 1 showing the coupling open.

Referring particularly to the drawing, the reference character 1 indicates a coupling which may be considered as comprising three main parts, body parts 2 and 3 having passageways therethrough and a connecting nut 4. Disposed in the part 2 is a helical spring 5 having one end mounted in a seat 6. The opposite end of the spring 5 has supported thereon a valve 7 provided with a cylindrical portion 8 about which the spring 6 is disposed in supporting relation. Preferably the valve 7 is made of some moldable plastic. The valve 7 is provided with a spherical zone 9 which engages with a complementary seat 10 of the part 2 when the coupling is open as viewed in Fig. 2, for preventing the passage of fluid therepast.

Arranged in the body part 3 is a cylindrical sleeve 15 which is secured interiorly of the part 3 and defines a part of the passageway through the coupling. Opposite an outer portion of the sleeve 15, and in the body part 3, is a bore 16 which defines, with the outer portion of the sleeve 15, an annular chamber 17. Relatively disposed in the chamber 17 is a sleeve valve 18. The sleeve valve 18 has a cylindrical portion 19 thereof in telescopic relation with the bore 16, a radially extending shoulder 20 and a cylindrical portion 21 in telescopic relation with the sleeve 15 when the valve is closed as viewed in Fig. 1. When the coupling 1 is open as viewed in Fig. 2, a helical spring 22 about the sleeve 15 urges the sleeve valve 18 outwardly until the seat 23 thereof abuts against the valve seat 24 which is supported by the sleeve 15. Apertures 25 are provided between the sleeve 15 and the valve seat 24 to permit the passage of fluid thereby, and the engagement of the seat 23 with the seat 24 is for preventing the passage of fluid through the coupling part 3 when the coupling 1 is open.

Arranged in the coupling part 3 in the outer part of the bore is a radially outwardly extending recess 26 in which is disposed an annular packing member 27 of rubber or the like. The packing member 27 is normally of circular cross section, but when the coupling is closed, as viewed in Fig. 1, the packing member 27 is of generally elliptical cross section.

The coupling part 2 is provided with an abutment member 30 which, when the coupling parts 2 and 3 are together and the coupling 1 is closed, abuts against an abutment member 31. As will be clear from the drawing, the abutment member 31 comprises the outer end of the portion of the coupling part 3 which defines the bore 16. The abutment member 30 is provided with an annular axially projecting lip 34 having a cylindrical surface 35 for telescopic engagement with the bore 16, and the annular sealing member 27. Also, the annular projecting lip 34 is provided with a transverse shoulder 36 which, when the coupling 1 is closed, abuts against the radial member 20 of the sleeve valve 18 to compress the spring 22 and resiliently urge the sleeve valve 18 inwardly of the annular chamber 17, shown particularly in Fig. 1. The sleeve 15 is provided with an opening 37 to provide communication between the passageway through the coupling part 3 and the chamber 17 to permit free movement of the sleeve valve 18 and to allow air to escape from the chamber 17.

In operation with the parts separated as disclosed in Fig. 2, fluid in the conduit passageway is sealed against escape from the ends of the coupling parts 2 and 3 by the engagement of the valve seats 9 and 10 and 23 and 24. When the coupling parts 2 and 3 are brought together, the annular projecting lip 34 engages the radial portion 20 of the sleeve valve 18 to move the same away from the seat 24, and at the same time the cylindrical surface 35 of the lip 34 engages the sealing member 27 to prevent leakage of fluid within the coupling from the coupling. Also at the same time the valve seat 24 urges the valve seat 9 away from the seat 10. Thus, a passage through the conduit is opened and the coupling is sealed against leakage. The nut 4 is screwed on the part 2 to effect a moving of parts 2 and 3 together to close the coupling. However, it is to be appreciated that the sealing action is the result of the sealing relation between the cylindrical surface 35 and the sealing member 27, rather than due to the tightness of the clamping of the parts 2 and 3 by the nut 4. When the nut 4 is loosened and the parts 2 and 3 separated, the sleeve valve 18 slides over the sealing member 27 to effect a sealing between the cylindrical surface 19 of the sleeve valve 18 and the bore 16 to prevent the escape of fluid therepast when the coupling 1 is opened. The remaining fundamental characteristics and operational advantages of the coupling 1, according to the present invention, are the same as those that have been described for the couplings disclosed in the aforesaid patents and application, and therefore they are not described in detail herein.

Having thus described my invention what I desire to secure by Letters Patent and claim is:

1. A fluid conduit coupling comprising two separable conduit parts having axial fluid passageways, abutting portions upon said parts surrounding said passageways, one of said abutting portions being fixed and the other having a fixed member and a movable member, a cylindrical bore defined in the outer wall structure of said part having the movable abutting member, a cylindrical sleeve in said last part defining, at least in part, the passageway therein, a valve seat supported by said sleeve at one end thereof and at one end of said last part, a fluid passage between said seat and sleeve, said sleeve and bore being in spaced relation to define a concentric annular chamber, said movable abutting member being slidably disposed in said chamber and having a wall in sliding relation with said bore, said bore having an annular recess therein adjacent the outer end thereof, an annular sealing means in said recess, a spring urging said movable abutting member axially outwardly of said chamber to move said movable abutting member into sealing relation with said annular sealing means when said coupling is open, an annular lip projecting from said fixed abutting portion into telescopic relation with said bore and annular sealing means when said coupling is closed, said lip being so positioned with respect to said movable abutting member as to slide the same axially inwardly of said chamber when said separable parts are being moved, and means to draw said parts together into abutting relation.

2. A fluid conduit coupling comprising two separable conduit parts having axial fluid passageways, abutting portions upon said parts surrounding said passageways, one of said abutting portions being fixed and the other having a fixed member and a movable member, a cylindrical bore defined in the outer wall structure of said part having the movable abutting member to provide a chamber, said movable abutting member being slidably disposed in said chamber and having a wall in sliding relation with said bore, said bore having an annular recess therein adjacent to the outer end thereof, an annular sealing means in said recess, a spring urging said movable abutting member axially outwardly of said chamber to move said movable abutting member into sealing relation with said annular sealing means when said coupling is open, an annular lip projecting from said fixed abutting portion into telescopic relation with said bore and annular sealing means when said means is closed, said lip being so positioned with respect to said movable abutting member as to slide the same axially inwardly of said chamber when said separable parts are being moved together, and means to draw said parts together into abutting relation.

3. A fluid conduit coupling comprising two separable conduit parts having axial fluid passageways, abutting portions upon said parts surrounding said passageways, one of said abutting portions being fixed and the other having a fixed member and a movable member, a cylindrical bore defined in the outer wall structure of said part having the movable abutting member, a cylindrical sleeve in said last part defining, at least in part, the passageway therein, a valve seat supported by said sleeve at one end thereof and at one end of said last part, a fluid passage between said seat and sleeve, said sleeve and bore being in spaced relation to define a concentric annular chamber, said movable abutting member being slidably disposed in said chamber and having a wall in sliding relation with said bore, said bore being provided with an annular sealing means recessed therein, a spring urging said movable abutting member axially outwardly of said chamber to move said movable abutting member into sealing relation with said annular sealing means when said coupling is open, an annular lip projecting from said fixed abutting portion into telescopic relation with said bore and annular sealing means when said coupling is closed, said lip being so positioned with respect to said movable abutting member as to slide the same axially inwardly of said chamber when said separable parts are being moved, and means to draw said parts together into abutting relation.

DONALD W. MAIN.